Jan. 23, 1973 D. E. ALBRIGHT 3,712,991

ELECTRICAL CIRCUIT FOR PROVIDING AND MAINTAINING A BINARY SIGNAL CHANGE IN RESPONSE TO A PREDETERMINED CHANGE IN A SENSED ANALOG CONDITION

Filed Aug. 12, 1971

INVENTOR.
DONALD E. ALBRIGHT
BY Kinney, Alexander, Sell, Steldt & De La Hunt
ATTORNEYS 3,712,991

ELECTRICAL CIRCUIT FOR PROVIDING AND MAINTAINING A BINARY SIGNAL CHANGE IN RESPONSE TO A PREDETERMINED CHANGE IN A SENSED ANALOG CONDITION

Donald E. Albright, Hugo, Minn., assignor to Minnesota Mining and Manufacturing Company, St. Paul, Minn.

Continuation-in-part of application Ser. No. 829,357, June 2, 1969, now Patent No. 3,599,349. This application Aug. 12, 1971, Ser. No. 171,202
Int. Cl. H03k 17/56, 3/35
U.S. Cl. 307—252 F 15 Claims

ABSTRACT OF THE DISCLOSURE

An analog condition is sensed by a photocell included in a voltage dividing network. The voltage dividing network thereby provides an analog signal which is indicative of the analog condition. The analog signal is applied to the gate of a PUT having its anode connected to a reference voltage source. In response to a predetermined change in the analog signal, the PUT is turned on to provide a binary signal change at its cathode. An impedance connected to the PUT cathode is of sufficiently low value relative to the impedance as seen at the PUT gate when the PUT is conducting to maintain the PUT in a conducting state when the sensed condition returns to a prechanged state. In one preferred embodiment a detection circuit coupling the PUT gate to the voltage dividing network enables detection at the PUT of only those changes in the analog signal which occur at a predetermined minimum rate of change.

CROSS REFERENCE TO RELATED APPLICATION

This application is a continuation-in-part of my co-pending application entitled Test Analyzer filed on June 2, 1969, S.N. 829,357, now issued as U.S. Pat. No. 3,599,349, dated Aug. 17, 1971. A portion of the disclosure herein is also set forth in the co-pending application of John L. Roche entitled Test Grading Device filed on Feb. 10, 1969, S.N. 798,016 now issued as U.S. Pat. No. 3,601,906, dated Aug. 31, 1971.

FIELD OF THE INVENTION

The present invention generally relates to electrical circuits of the type which provide and maintain a binary signal change in response to a predetermined change in a sensed analog condition, and specifically relates to circuits of this type utilizing programmable unijunction transistors (hereinafter referred to as PUT's). The present invention further pertains to an improvement in this type of circuit whereby the binary signal change is provided and maintained in response to changes in the sensed analog condition which occur at a predetermined minimum rate of change.

DESCRIPTION OF THE PRIOR ART

Typically, electrical circuits which both provide and maintain a binary signal change in response to a predetermined change in a sensed analog condition include both a trigger circuit, such as a Schmitt trigger circuit, which provides a binary signal change in response to a predetermined change beyond a threshold in a sensed analog condition, and a bistable circuit, such as an R–S flip-flop, which is coupled to the trigger circuit to be "set" in response to the receipt of the binary signal change from the trigger circuit, thereby maintaining a binary signal at the flip-flop output in a changed state until a "resest" signal is applied to the flip-flop.

Such electrical circuits are useful in mark sensing apparatus such as the test analyzer described in my above-referenced co-pending application, now issued as U.S. Pat. No. 3,599,349, or such as the test grading device described in the above-referenced application, now issued as U.S. Pat. No. 3,601,906. Therein the analog condition which is sensed is the amount of light reflected from an answer sheet containing answer indication areas, the reflectivity of which answer indication areas depends upon whether a student has placed a dark mark therein.

Problems are sometimes experienced when this type of circuit is used in a mark sensing apparatus and wherein the binary signal change is initially provided in response to a predetermined change beyond a threshold, such as a D.C. voltage level, in the analog signal indicative of the sensed analog condition. For example such an electrical circuit when used in a mark sensing apparatus containing a photo-optical sensing system, sometimes responds not only to the marks in the prescribed indication areas, e.g. the answer indication areas of an answer sheet, but also responds to extraneous marks on a scanned sheet, such as erasures in indication areas. The reason that this problem is sometimes experienced is because of variation in certain of the system characteristics, e.g. lamp-aging, variable sheet reflective properties, photo-cell memory due to hysteresis, and temperature co-efficients of sensing elements, any one of which can cause changes in the D.C. voltage levels which occur in the circuit.

Still another problem is the erroneous triggering of the trigger circuit because of electrical noise.

Various applications for PUT's are discussed in General Electric, "The D13T– A Programmable Unijunction Transistor" by W. R. Spofford, Jr., Syracuse, N.Y.

SUMMARY OF THE INVENTION

In accordance with the present invention there is provided an electrical circuit for providing and maintaining a binary signal change in response to a predetermined change in an analog signal indicating a sensed condition, which electrical circuit comprises a voltage dividing network, including a variable impedance device for sensing a said condition; and a PUT having its gate coupled to the voltage dividing network to detect a change in an analog signal occurring in the voltage dividing network, and having its anode coupled to a reference voltage source having an impedance sufficiently low to maintain conduction of the PUT. The analog signal is indicative of the sensed condition. The PUT may thereby be set into conduction to thereby provide at its cathode, a binary signal change in response to a predetermined change in the analog signal. The circuit also comprises an impedance connected to the PUT cathode which is of sufficiently low value relative to the impedance as seen at the PUT gate when the PUT is conducting to maintain the PUT in a conducting state when the sensed condition returns to a pre-changed state. Because of this impedance relationship, the gate voltage is prevented from returning to the value existant prior to the change in the sensed condition even though the sensed condition returns to its pre-changed state.

By means of the present invention the functions of providing and maintaining a binary signal change in response to a change in a sensed analog condition may be accomplished by a simple circuit containing a single active element, the PUT.

The present invention further provides as an improvement to electrical circuits of this general type, a detection circuit for enabling a binary signal change to be provided and maintained by the electrical circuit in response to only those changes in the analog signal which occur at a predetermined minimum rate of change. By providing that the circuit responds to only those changes which occur at a detected minimum rate of change in the analog condition rather than to a detected change beyond the fixed threshold reference, the problem due to changing D.C. voltage levels occuring in the circuit due to variations in the characteristics of certain of the system components, as discussed above, are greatly alleviated.

There is also provided, programming means for establishing the minimum magnitude of change in the analog signal to which the electrical circuit of the present invention responds to provide and maintain a binary signal change. By making the bindary signal changing response of the PUT dependent upon both the rate of change and the magnitude of change in the analog signal, greater reliability is provided.

The present invention further provides novel means for resetting the PUT and for reinstating the detection circuit to its condition which existed prior to sensing any change in the analog signal.

In addition, means for preventing erroneous setting or resetting of the PUT in response to electrical noise in the circuit is provided.

DESCRIPTION OF THE PREFERRED EMBODIMENT

Figure 1:
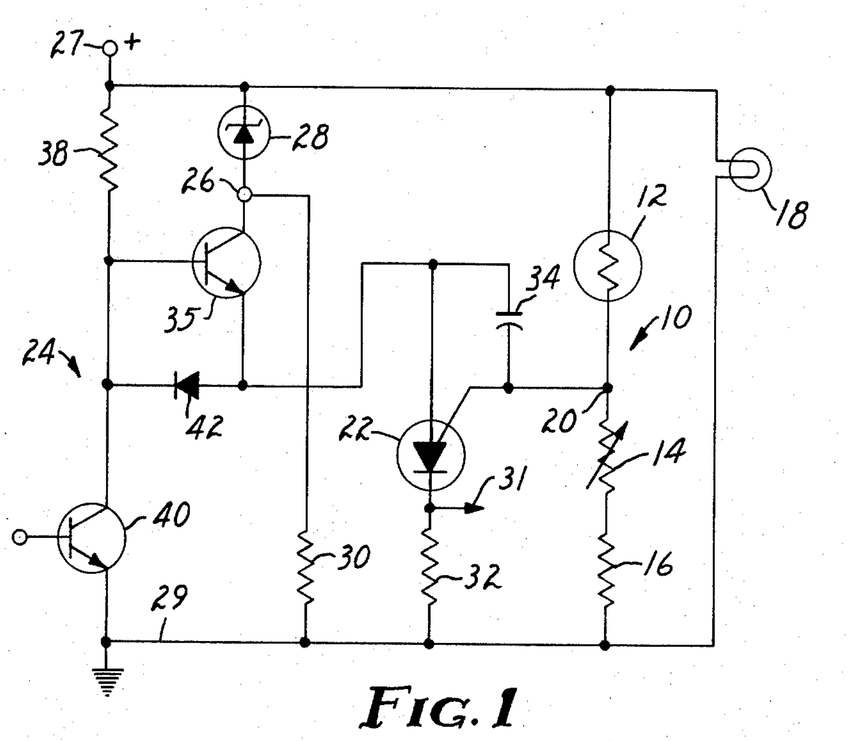
FIG. 1 is a schematic circuit diagram of a preferred embodiment of the electrical circuit of the present invention.

Referring to the circuit of FIG. 1 (which circuit is also contained in FIG. 2 of my above referenced co-pending application), the voltage dividing network 10 includes a photocell 12, a variable resistance 14, and a fixed resistance 16. The photocell 12 is a variable impedance device which senses as an analog condition the quantity of light reflected by a surface from a lamp 18. An analog signal indicative of this sensed analog condition is thus present at junction 20 in the voltage dividing network 10.

The gate of the PUT 22 is connected to the junction 20. The anode of the PUT 22 is coupled through a control circuit 24 to a reference voltage source 26 having an impedance sufficiently low to maintain conduction of the PUT 22. The reference voltage source 26 is coupled to a supply voltage source 27 through a Zener diode 28.

In order to keep changes in the supply voltage from affecting the sensitivity of the circuit the reference voltage which is supplied to the anode of the PUT 22 is biased at a value which is approximately 5 volts below the level of the supply voltage. Thus if the supply voltage across the voltage dividing network 10 increases with reference to ground the reference voltage which is applied to the anode of the PUT 22 also increases with reference to ground. The reference voltage source 26 is provided at the anode of the Zener diode 28 which has its cathode connected to the supply voltage source 27. The anode of the Zener diode 28 is coupled to the common or ground line 29 through a resistor 30.

The binary signal is provided and maintained at the output terminal 31 which is connected to the cathode of the PUT 22. The cathode of the PUT 22 is coupled through a resistor 32 to the common line 29. The impedance of the resistor 32 is low in relation to the impedance as seen at the gate of the PUT 22 when the PUT 22 is conducting in order to maintain conduction of the PUT 22 when the sensed analog condition returns to a pre-changed state.

A capacitor 34 is connected between the anode and gate of the PUT 22 in order to prevent the PUT 22 from being set or reset due to spurious signals.

The control circuit 24 includes a first npn transistor 35. The base of the transistor 35 is coupled to the supply voltage source 27 through a resistor 38. The collector of the transistor 35 is connected to the reference voltage source 26. The emitter of the transistor 35 is connected to the anode of the PUT 22. The control circuit 24 also includes a second npn transistor 40. The collector of the transistor 40 is connected to the base of the first transistor 35. The emitter of the transistor 40 is connected to the common line 29. A rectifier diode 42 is connected between the emitter and base of the transistor 35 to prevent the same 35 from conducting when the transistor 40 is conducting. The transistor 40 conducts when a positive voltage is applied to its base.

In a preferred embodiment of FIG. 1 the reference voltage source 26 is at approximately 10 volts D.C. above common or ground line 29 and the supply voltage source 27 is at approximately 15 volts D.C. The identification or value of the circuit elements for one embodiment of the circuit shown in FIG. 1 are:

| | |
|---|---|
| Photocell | |
| 12 | CL905HL |
| Rectifier | |
| 42 | DHD806 |
| Resistors | |
| 16 | 33KΩ |
| 30 | 470Ω |
| 32 | 2.2KΩ |
| 38 | 1KΩ |
| PUT | |
| 22 | D13T1 |
| Capacitor | |
| 34 | 0.022 μf. |
| NPN transistors | |
| 35 | 2N4400 |
| 40 | 2N5172 |
| Variable resistors | |
| 14 | 200KΩ |
| Zener diode | |
| 28 | 1N4732A |

The operation of the circuit of FIG. 1 is as follows. When the circuit is in condition for providing and maintaining a binary signal change in response to a predetermined change in an analog signal, such as is present at the junction 20, a positive voltage signal is not present at the base of the transistor 40. Therefore the transistor 35 is conducting and a voltage of approximately 10 volts is provided from the reference voltage source 26 to the anode of the PUT 22.

The photocell 12 becomes relatively non-conductive upon sensing a darkened area. Upon the photocell 12 sensing a darkened area, the voltage level of the analog signal at the junction 20 (which is also the voltage level at the gate of the PUT 22) decreases to a level sufficiently less than the potential at the anode of the PUT 22 provided from the reference voltage source 26, to thereby turn on the PUT 22 and to thereby provide a binary signal change at the output terminal 31 connected to the cathode of the PUT 22. Since the resistor 32 connected to the cathode of the PUT 22 is of low impedance relative to the impedance as seen at the gate of the PUT 22, when the PUT 22 is conducting, the holding current through the PUT 22 is sufficient to maintain the PUT 22 in a conducting state and thereby maintain the binary signal at the output terminal 31 in its changed state, even after the condition sensed by the photocell 12 changes back to its pre-changed state which existed at the time prior to the PUT 22 being turned on. The binary signal change is thus maintained at the terminal 31 until the PUT 22 is reset.

The PUT 22 is reset when a positive voltage is provided to the base of the transistor 40. When the transistor 40 conducts the transistor 35 is turned off and the anode of the PUT 22 is connected through the diode 42 and the transistor 40 to the common or ground line 29 thereby turning off the PUT 22. It is important that the positive voltage signal which is applied to the base of the transistor 40 to reset the PUT 22 be provided only at such times as when the PUT 22 is not expected to provide and maintain a binary signal change in response to a predetermined change in a sensed analog condition. In my above referenced co-pending application, I have described a circuit for periodically providing positive voltage pulses of a predetermined duration to the base of a control circuit transistor such as the transistor 40, wherein the pulses are provided only at such times as when the PUT is not expected to so provide and maintain a binary signal change. Such description is incorporated herein by reference. The periodically provided pulses are derived from the junction of resistors 83 and 84 in FIG. 2 therein.

PUT's are generally temperature stable but very sensitive threshold sensing devices. The voltage dividing network 10 may be adjusted to set the minimum threshold level of light beyond which the PUT will provide and maintain a binary signal change in response to sensing an amount of light below a minimum reference level of light, such as when sensing a non-reflective or darkened area. By adjusting the variable resistor 14 in the voltage dividing network 10 to set this threshold level, the PUT 22 may be made to provide a binary signal change in response to sensing marks such as answer indications which are made by a black lead pencil but not in response to sensing other markings in a scanned area such as the brackets or question numbers which are printed on an answer sheet with an ink having greater reflective properties. The combination of a PUT and a voltage dividing network also provides compensation for variations in the light-versus-resistance characteristics of a photocell and in the light output characteristics of various sources of reflected light. This combination of a PUT and a voltage dividing network is also useful in providing and maintaining a binary signal change in response to a change beyond a threshold of analog signals indicating other sensed conditions than light intensity. Also phototransistors may be substituted for the photocells to provide a faster response and a greater signal-to-noise ratio.

Figure 2:
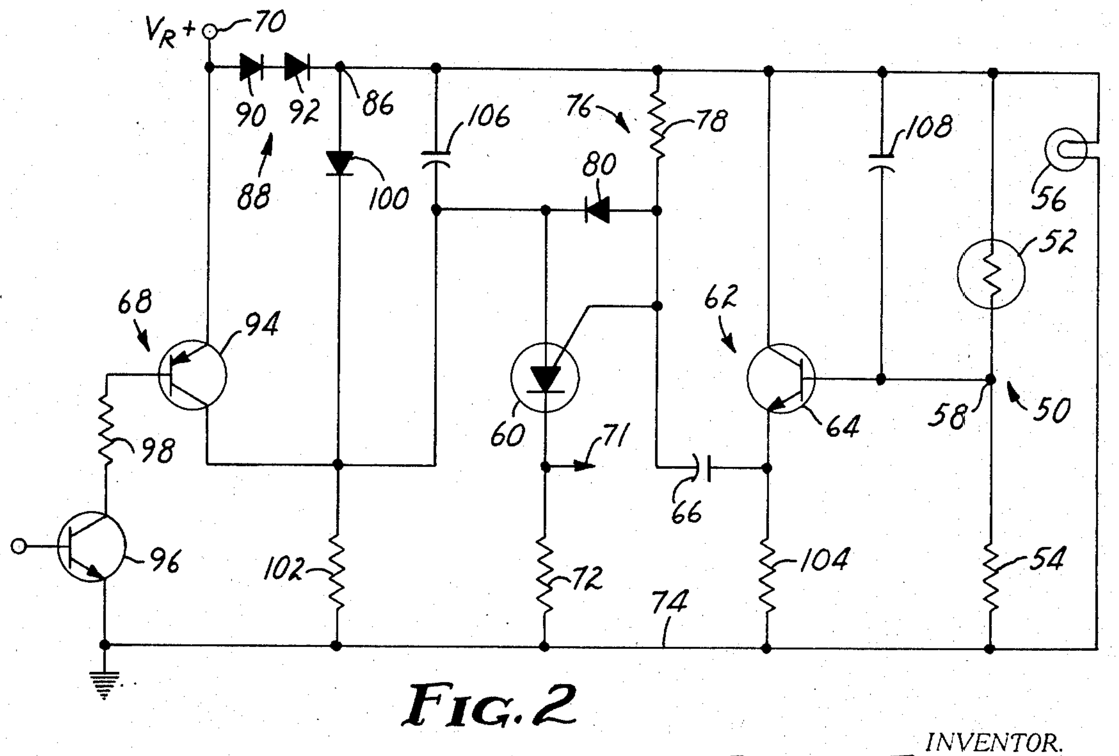
FIG. 2 is a schematic circuit diagram of a preferred embodiment of the electrical circuit of the present invention, which embodiment includes the detection circuit for enabling a binary signal change to be provided and maintained by the electrical circuit in response to only those changes in the analog signal which occur at a predetermined minimum rate of change.

Referring to the circuit of FIG. 2 herein, the voltage dividing network 50 includes a photocell 52 and a fixed resistance 54. The photocell 52 is a variable impedance device which senses as an analog condition the quantity of light reflected by a surface from a lamp 56. An analog signal indicative of this sensed analog condition is thus present at the junction 58 in the voltage dividing network 50.

Changes in the analog signal at the junction 58, which occur at at least a predetermined minimum rate of change, are detected at the gate of the PUT 60 by means of a detection circuit 62 connected between the junction 58 and the gate of the PUT 60. The predetermined minimum rate of change is chosen to prevent detection of analog signal changes which occur at a lesser rate due to variations in the characteristics of the photo-optical sensing system, as discussed above.

The detection circuit 62 includes an emitter-follower transistor amplifier 64 and a capacitor 66. The emitter-follower transistor amplifier is an npn transistor having its base connected to the junction 58 for transferring the analog signal to its emitter. The capacitor 66 is connected between the emitter of the transistor amplifier 66 and the gate of the PUT 60. The capacitance of the capacitor is selected to enable detection at the gate of the PUT 60 of only those changes in the analog signal at the junction 58, which occur at a predetermined minimum rate of change. The capacitance value of the capacitor 66 bears an inverse relationship to the minimum rate of change of analog signal changes which may be detected.

It should be noted that when the circuit of FIG. 2 is used in a mark sensing apparatus, such as the test grading device described in the above referenced application to be issued as U.S. Pat. No. 3,601,906, the rate at which the sensed analog condition changes is dependent upon the rate at which the scanning means including a photocell, such as the photocell 52, moves in relation to the scanned answer indication areas.

The anode of the PUT 60 is coupled through a biasing network 88 to a reference voltage source 70.

The binary signal is provided and maintained at the output terminal 71 which is connected to the cathode of the PUT 60. The cathode of the PUT 60 is coupled through a resistor 72 to a common or ground line 74. The impedance of the resistor 72 is low in relation to the impedance as seen at the gate of the PUT 60 when the PUT 60 is conducting in order to maintain conduction of the PUT 60 when the sensed analog condition returns to a pre-changed state.

The minimum magnitude of change in the analog signal to which the PUT 60 responds to provide and maintain a binary signal change is established by a programming network 76. The programming network 76 includes a resistor 78 and a diode rectifier 80. The resistor 78 is connected between the gate of the PUT 60 and the terminal 86, and is thereby coupled to the reference voltage source 70 through the biasing network 88. The rectifier diode 80 is connected between the anode and gate of the PUT 60 for reverse biasing the PUT gate at a voltage greater than the PUT anode voltage when the PUT 60 is not conducting. In establishing the minimum magnitude of change in the analog signal to which the PUT responds, the resistance value of the resistor 78 is selected in inverse relationship to the desired magnitude and the rectifier diode 80 is selected to provide a voltage drop having a direct relationship to the desired magnitude.

A switching network 68 is connected to the anode of the PUT 60, to the biasing network 88, and to the reference voltage source 70. The switching network 68 includes a pnp transistor 94. The emitter of the transistor 94 is connected to the reference voltage source 70 and the collector of the transistor 94 is connected to the anode of the PUT 60. The switching network 68 also includes an npn transistor 96. The emitter of the transistor 96 is connected to the common line 74 and the collector of the transistor 96 is connected through a resistor 98 to the base of the transistor 94. The transistor 96 conducts when a positive voltage is applied to its base.

The biasing network 88 includes two rectifier diodes 90 and 92 for biasing the terminal 86 at a predetermined voltage less than the voltage at the reference voltage source 70. The biasing network 88 also includes a third rectifier diode 100 which together with the diodes 90 and 92 biases the anode of the PUT 60 at a first predetermined voltage less than the reference voltage when the transistor 94 is not conducting.

The circuit also includes a resistor 102 connected between the anode of the PUT 60 and the common line 74 and a resistor 104 connected between the common line 74 and the junction between the capacitor 66 and the transistor amplifier 64.

In order to prevent erroneous setting or resetting of the PUT 60 in response to an electrical noise in the circuit, the circuit further includes a capacitor 106 connected between the anode of the PUT 60 and the terminal 86 and a capacitor 108 connected between the terminal 86 and the base of the transistor amplifier 64.

In a preferred embodiment of FIG. 2 the reference voltage source is at approximately 16.2 volts D.C. above the common or ground line 74. The identification or value of the circuit elements for one embodiment of circuit 2 are as follows.

| | |
|---|---|
| **Photocell** | |
| 52 | CL905HL |
| **PUT** | |
| 60 | D13T1 |
| **NPN transistors** | |
| 64 | 2N5172 |
| 96 | 2N5172 |
| **PNP transistor** | |
| 94 | 2N4125 |
| **Rectifiers** | |
| 80 | DHD806 |
| 90 | IN4002 |
| 92 | IN4002 |
| 100 | IN4002 |
| **Capacitors** | |
| 66 | .47μf. |
| 106 | 0.22μf. |
| 108 | .022μf. |
| **Resistors** | |
| 54 | 33KΩ |
| 78 | 68KΩ |
| 72 | 6.8KΩ |
| 98 | 1KΩ |
| 102 | 1KΩ |
| 104 | 4.7KΩ |

The voltage drop from the emitter to the collector of transistor 94 is approximately .2 volt and the voltage drop from the anode to the gate of the PUT 60 is approximately .7 volt. The voltage drop across each of the rectifier diodes 80, 90, 92 and 100 is approximately .5 volt.

The operation of the circuit of FIG. 2 is as follows. When the circuit is in condition for providing and maintaining a binary signal in response to a predetermined change in the analog signal present at junction 58 a positive voltage signal is not present at the gate of the transistor 96. Therefore the transistor 94 is not conducting and a voltage of approximately 14.7 volts is provided from the reference voltage source 70 through the biasing network 88 to the anode of the PUT 60.

The photocell 52 becomes relatively non-conductive upon sensing a darkened area, the voltage level of the analog signal at the junction 58 decreases. This decrease in the analog signal level is transferred through the emitter-follower transistor amplifier 64 to the capacitor 66. Depending upon the rate of change in the analog signal level, this decreased analog signal is coupled by the capacitor 66 to the gate of the PUT 60. If the magnitude of the change in the analog level coupled through the capacitor 66 to the gate of the PUT 60 is greater than the minimum magnitude established by the values of the resistor 78 and the rectifier diode 80 for turning on the PUT 60, the PUT is rendered conductive and a binary signal change occurs at the output terminal 71 connected to the cathode of the PUT 60.

Since the resistor 72 connected to the cathode of the PUT 60 is of low impedance, relative to the impedance as seen at the gate of the PUT 60 when the PUT 60 is conducting, the holding current through the PUT 60 is sufficient to maintain the PUT 60 in a conducting state and thereby maintain the binary signal at the output terminal 71 in its changed state, even after the condition sensed by the photocell 52 changes back to its pre-changed state which existed at the time prior to the PUT 60 being turned on. The binary signal change is thus maintained at the terminal 71 until the PUT 60 is reset.

The PUT 60 is reset and the detection circuit 62 is reinstated to its condition prior to the sensing of any change in the analog signal as follows. A positive voltage pulse of a predetermined duration is applied as an input signal to the base of the transistor 96. Thereupon transistor 96 conducts and turns on the transistor 94. Upon transistor 94 conducting the biasing network 88 is bypassed and a second predetermined voltage of 16 volts is applied to the anode of the PUT 60. The PUT is thereby turned on unless it was already conducting in which case it continues to conduct. Upon the PUT 60 having 16 volts applied to its anode, the voltage level at the gate of the PUT increases to 15.3 volts. Thus a 15.3 volt signal is stored at the gate of the PUT 60 by the capacitor 66. Following the predetermined duration of the positive voltage pulse applied to the base of transistor 96 the transistor 96 ceases to conduct. Thereupon the transistor 94 also ceases to conduct and the biasing network 88 again provides a 14.7 voltage level at the anode of the PUT 60. Inasmuch as a 15.3 volt voltage is then being stored at the gate of the PUT 60 by the capacitor 66, the PUT 60 is then turned off and thereby reset. Upon termination of conduction by the PUT 60 the capacitor 66 discharges through the rectifier diode 80 and the resistors 102 and 104. Thereby the charge on the capacitor 66 is reinstated to its level before being charged, either in response to a change in the sensed condition or in response to the resetting of the PUT.

What is claimed is:

1. An electrical circuit for providing and maintaining a binary signal change in response to a predetermined change in an analog signal indicating a sensed condition, comprising a voltage dividing network, including a variable impendance device for sensing a said condition;

a PUT having its gate coupled to the voltage dividing network to detect a change in an analog signal occurring in the voltage dividing network, which analog signal is indicative of said sensed condition, and having its anode coupled to a reference voltage source having an impedance sufficiently low to maintain conduction of the PUT, whereby the PUT may be set into conduction to thereby provide at its cathode a binary signal change in response to a predetermined change in said analog signal; and an impedance connected to the PUT cathode which is of sufficiently low value relative to the impedance as seen at the PUT gate when the PUT is conducting to maintain the PUT in a conducting state when said sensed condition returns to a pre-changed state.

2. An electrical circuit according to claim 1, further comprising a detection circuit connected between the voltage dividing network and the PUT gate for enabling detection at the PUT gate of only those changes in said analog signal which occur at a predetermined minimum rate of change.

3. An electrical circuit according to claim 2, further comprising programming means for establishing a minimum magnitude of change in the anolog signal to which the electrical circuit responds to provide and maintain said binary signal change.

4. An electrical circuit according to claim 2, wherein the detection circuit comprises an emitter-follower transistor amplifier having its base connected to the voltage dividing network for transferring said analog signal to its emitter; and a capacitor connected between the transistor amplifier emitter and the PUT gate, which capacitor has a capacitance selected to enable detection at the PUT gate of only those changes in said analog signal which occur at said predetermined minimum rate of change.

5. An electrical circuit according to claim 4, further comprising means for preventing erroneous setting or resetting of the PUT in response to electrical noise in the circuit, comprising a second capacitor connected to the PUT anode and coupled to the reference voltage source; and a third capacitor connected to the base of the transistor amplifier and coupled to the reference voltage source.

6. An electrical circuit according to claim 4, further comprising means for resetting the PUT and for reinstating the detection circuit to its condition prior to sensing any change in said analog signal.

7. An electrical circuit according to claim 6, wherein the resetting and reinstating means comprise a biasing network coupled to the reference voltage source and to the PUT anode for biasing the PUT anode at a first predetermined voltage less than said reference voltage;

a switching network connected to the PUT anode, to the first biasing network, and to the reference voltage source, which switching network is responsive to an input signal to switch the reference voltage source into connection with the PUT anode for a predetermined duration and thereby bypass the biasing network during said predetermined duration for biasing the PUT anode at a second predetermined voltage greater than said first predetermined voltage during said predetermined duration;

a programming network including a diode connected between the PUT anode and gate for reverse biasing the PUT gate at a voltage greater than the PUT anode voltage when the PUT is not conducting, and a first resistor connected to the PUT gate and coupled between the PUT gate and the reference voltage source for biasing the PUT gate at a third predetermined voltage less than said second predetermined voltage;

a second resistor connected between the PUT anode and a common or ground; and a third resistor connected between the common or ground and the junction between the capacitor and the transistor amplifier;

whereby when a said input signal is received by the switching network, said second predetermined voltage is applied to the PUT anode to cause the PUT to conduct for said predetermined duration to thereby cause the capacitor to store at the PUT gate a fourth predetermined voltage less than said second predetermined voltage and greater than said first predetermined voltage;

whereby following said predetermined duration the first biasing network biases the PUT anode at said first predetermined voltage to thereby terminate conduction of the PUT; and whereby upon termination of PUT conduction the capacitor discharges through the diode and the second and third resistors to thereby reinstate the charge on the capacitor to its level before being charged either in response to a change in the sensed condition or in response to the resetting of the PUT.

8. An electrical circuit according to claim 1, comprising programming means for establishing a minimum magnitude of change in the analog signal to which the electrical circuit responds to provide and maintain said binary signal change.

9. An electrical circuit according to claim 8, wherein the programming means comprises a diode connected between the PUT anode and gate for biasing the PUT gate at a voltage greater than the PUT anode voltage when the PUT is not conducting.

10. An electrical circuit according to claim 8, wherein the programming means comprises a resistor connected to the PUT gate and coupled to the reference voltage source.

11. An electrical circuit according to claim 10, wherein the programming means further comprises a diode connected between the PUT anode and gate for biasing the PUT gate at a voltage greater than the PUT anode voltage when the PUT is not conducting.

12. An electrical circuit for providing and maintaining a binary signal change in response to a predetermined change in an analog signal indicating a sensed condition wherein the improvement comprises a detection circuit connected to a means for providing and maintaining said binary signal change, for causing said binary signal change to be provided and maintained in response to only those changes in said analog signal which occur at a predetermined minimum rate of change; and programming means for establishing a minimum magnitude of change in said analog signal to which the electrical circuit responds to provide and maintain said binary signal change.

13. An electrical circuit according to claim 12, wherein the detection circuit comprises an emitter-follower transistor amplifier having its base connected for transferring said analog signal to its emitter; and a capacitor connected to the transistor amplifier emitter, which capacitor has an capacitance selected to enable detection in said electrical circuit of only those changes in said analog signal which occur at said predetermined rate of change.

14. Means for providing and maintaining a binary signal in response to a change beyond a threshold in an analog signal indicating a sensed condition, comprising a voltage dividing network, including a variable resistive device for sensing a said condition; and a PUT having its gate lead connected to the voltage dividing network;

whereby the binary signal provided and retained at the cathode lead of the PUT has as a reference voltage, voltage provided at the anode lead of the PUT.

15. The means for providing and maintaining a binary signal according to claim 14 for responding to a change beyond a threshold level of sensed light intensity, wherein the variable resistive device is a photocell.

References Cited

UNITED STATES PATENTS 3,449,593 6/1969 Marino ---------- 328—132 X

JOHN ZAZWORSKY, Primary Examiner

U.S. Cl. X.R.

307—231, 284; 328—114, 132